United States Patent [19]

Deal et al.

[11] Patent Number: 4,514,456
[45] Date of Patent: Apr. 30, 1985

[54] METHOD OF MAKING A CODED MARKING IN A GLASS WORKPIECE EMPLOYING A TRISILICATE COATING AND PRODUCT THEREOF

[75] Inventors: Samuel B. Deal; Barry M. Cushman, both of Lancaster, Pa.

[73] Assignee: RCA Corporation, Princeton, N.J.

[21] Appl. No.: 420,496

[22] Filed: Sep. 20, 1982

[51] Int. Cl.³ .......................... B32B 3/10; B32B 5/16; B32B 7/00
[52] U.S. Cl. .................................. 428/204; 427/53.1; 427/64; 427/165; 427/270; 427/271; 428/206; 428/208; 428/210; 428/212; 428/428; 428/446
[58] Field of Search ................. 428/35, 172, 428, 446, 428/204, 206–208, 210, 212; 427/53.1, 64, 165, 270, 271

[56] References Cited

U.S. PATENT DOCUMENTS

| | | | |
|---|---|---|---|
| 3,635,751 | 1/1972 | Long et al. | 428/428 |
| 4,253,409 | 3/1981 | Arnold | 428/428 |
| 4,323,755 | 4/1982 | Nierenberg | 219/121 |
| 4,327,283 | 4/1982 | Heyman et al. | 235/487 |
| 4,340,645 | 7/1982 | O'Conor | 428/428 |

Primary Examiner—Marion E. McCamish
Assistant Examiner—P. R. Schwartz
Attorney, Agent, or Firm—Eugene M. Whitacre; Dennis H. Irlbeck; LeRoy Greenspan

[57] ABSTRACT

An undercoating is deposited on a glass workpiece and an overcoating is applied upon the undercoating. Then a plurality of related marks is recessed through the overcoating, thereby producing the novel workpiece. Each of the undercoating and overcoating is comprised of pigment particles and an alkali silicate binder. The alkali silicate binder of at least one coating, and preferably both the undercoating and the overcoating, consists essentially of a mixture of sodium silicate, potassium silicate and lithium silicate. The coatings are made from aqueous suspensions of pigment particles, dissolved sodium silicate, dissolved potassium silicate and lithium-stabilized silica sol.

10 Claims, 4 Drawing Figures

U.S. Patent     Apr. 30, 1985     4,514,456
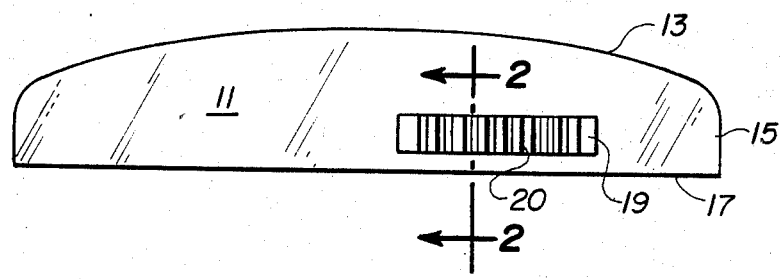
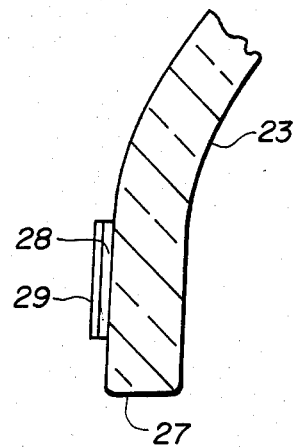
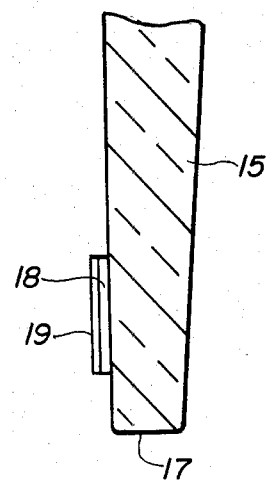
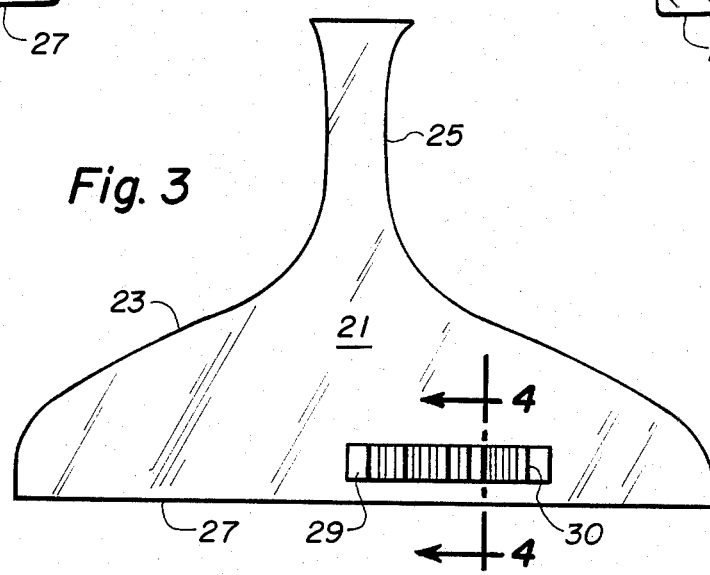

METHOD OF MAKING A CODED MARKING IN A GLASS WORKPIECE EMPLOYING A TRISILICATE COATING AND PRODUCT THEREOF

BACKGROUND OF THE INVENTION

This invention relates to a method of making a coded marking in a glass workpiece and particularly, although not exclusively, in making a machine-readable coded marking in a glass-envelope part of a CRT (cathode-ray tube).

U.S. Pat. No. 4,327,283 issued Apr. 27, 1982 to P. M. Heyman et al. describes a glass workpiece that carries a machine-readable coded marking, such as a bar-code marking, in its external surface. In one form, the glass workpiece comprises a main body, a thin undercoating on a portion of the external surface of the body, and a thin overcoating of contrasting color on the undercoating. The marking comprises a related sequence of substantially-parallel bars recessed into and through the overcoating. The marking may be made by spraying the coatings, each of which consists essentially of an aqueous suspension of pigment particles and an inorganic binder therefor, on selected areas of the workpiece and then recessing the marks into and through the overcoating. Recessing can be achieved by abrading the overcoating, as with a sandblast, or ablating the marks into the coating, as with a laser beam. The inorganic binders used in the sprayed coatings of this prior method consist essentially of a single component, usually a glass frit or an alkali silicate, such as potassium silicate.

The method and markings disclosed in the Heyman et al. patent perform well when produced at relatively slow rates upon glass-envelope parts for cathode-ray tubes. However, when the rates at which these markings are produced are accelerated so that the cycle time for drying the coatings is shortened to less than 60 seconds, many problems arise. The drying temperatures have to be raised. This leads to problems of glass breakage caused by the high temperature required for drying these coatings. Also frequency spray-gun clogging is experienced when using these prior coatings. With the shortened cycle time and higher drying temperatures, an increasing proportion of the coatings produced must be rejected for flaking and/or peeling. Also, there is a need to improve the contrast between the undercoatings and the overcoating so that the markings can be read more reliably.

SUMMARY OF THE INVENTION

In the novel method, as in the accelerated form of the prior method disclosed in Heyman et al., each of an undercoating and an overcoating is applied one upon the other, each being dried in less than about 60 seconds. Then, a plurality of related marks is recessed through the overcoating, thereby producing the novel workpiece. Each of the undercoating and the overcoating is comprised of pigment particles and an inorganic binder. However, unlike the prior practice, the inorganic binder of at least one, and preferably both the undercoating and the overcoating, consists essentially of three components, specifically a mixture of sodium silicate, potassium silicate and lithium silicate. The coatings are made from aqueous suspensions of pigment particles containing dissolved sodium silicate, dissolved potassium silicate and lithium-stabilized silica sol. When the novel method is practiced using a three-component binder from this family of binders, the coatings can be dried faster and at lower temperatures than the coatings made with a single-component binder by the prior methods. Also, coatings produced by the novel method exhibit better adhesion to glass surfaces than similar prior coatings, resulting in fewer rejects for flaking and/or peeling. Many of the markings produced by the novel method also exhibit better contrast with the background field.

BRIEF DESCRIPTION OF THE DRAWINGS

FIG. 1 is an elevational view of a glass faceplate panel for a CRT carrying a bar-code marking in the sidewall thereof prepared according to the novel method.

FIG. 2 is a sectional view along section lines 2—2 of a fragment of the panel shown in FIG. 1.

FIG. 3 is an elevational view of a glass funnel for a CRT carrying a bar-code marking in a surface thereof prepared according to the novel method.

FIG. 4 is a sectional view along section lines 4—4 of a fragment of the funnel shown in FIG. 3.

DETAILED DESCRIPTION

A typical glass faceplate panel 11 to be used as part of the envelope of a color television picture tube is shown in FIGS. 1 and 2. The panel 11 includes a rectangular viewing window 13 and an integral sidewall 15 around the window. The sidewall 15 has a panel seal land 17 at the distal end thereof. A thin integral panel undercoating 18 (FIG. 2) of a dark-colored light-absorbing material is located on the external side of the sidewall 15 in the area of interest. A thin integral panel overcoating 19 of a light-colored, light-reflecting material is located on the external side of the undercoating 18. A machine-readable coded marking 20 is indented, e.g., abraded or ablated, through the panel overcoating 19. The marking 20 comprises a related sequence of substantially-parallel bars or stripes of predetermined widths and spacings, which are popularly referred to as a bar-code marking. Any of the codes used for bar-code marking may be used on the panel 11. In this specific embodiment, the marking 20 uses the interleaved two-of-five code which employs bars of one-unit and three-unit widths and spaces therebetween of one-unit and three-unit widths. Since bar codes are described in detail elsewhere, no further description of the code itself is necessary.

A typical glass funnel to be used as part of the envelope of a color television picture tube is shown in FIGS. 3 and 4. The funnel includes a cone 23, a neck 25 integral with the narrow end of the cone 23 and a funnel seal land 27 at the wide end of the cone 23. A thin integral funnel undercoating 28 of a dark-colored, light-absorbing material is located on the external surface of the cone in the area of interest. A thin integral funnel overcoating 29 of light-colored, light-reflecting material is located on the external side of the funnel undercoating 28. A machine-readable coded marking 30 as described above for the panel 11 is indented, e.g, abraded or ablated, through the funnel overcoating 29. In both FIGS. 1 and 3, the coatings and the markings may be placed anywhere on the workpieces. However, for making and reading the markings automatically by machine, it is important that the markings be placed at locations that are easily located and accessed.

As shown in FIG. 1, the panel marking 20 and the marks thereof are about 19 mm (0.75 inch) high and about 76.2 mm (3.00 inches) wide. The closest edge of the panel marking 20 is about 19 mm (0.75 inch) away from the seal land 17, and the bars of the marking 20 extend in a direction about normal to the surface of the seal land 17. The recessed marks are either about 0.6 mm (0.025 inch) or about 1.9 mm (0.075 inch) wide. The panel marking 20 includes a central portion with specific identifying information, typically about 63.5 mm (2.50 inches) wide, and end portions about 6.3 mm (0.25 inch) wide at each end of the central portion for signaling a machine reader the "start" and the "stop" of the marking. The panel coatings 18 and 19 are slightly wider than the panel marking 20, providing a border about 0.6 mm (0.025 inch) wide at each end of the panel marking 20.

The funnel marking 30 on the funnel 21 shown in FIG. 3 is similar to the above-described panel marking 20 and is located about 19 mm (0.75 inch) from the funnel seal land 27. During subsequent processing, the panel and the funnel may be joined together at their respective seal lands by methods known in the art. The coatings 18, 19, 28 and 29 and the markings 20 and 30 are not degraded during the common frit-sealing method which employs temperatures of more than 400° C.

In addition to a light-reflecting ability, the following characteristics in the panel and the funnel overcoatings 19 and 29 are desirable:

(1) effective scatterer and depolarizer of light,
(2) resistant to temperatures of at least 450° C.,
(3) chemically resistant to chemicals as used in processing of kinescopes,
(4) mechanically resistant to the abrasions and impacts typical of kinescope handling during manufacturing,
(5) ability to be removed cleanly by an abrasive or ablative process, and
(6) high optical contrast with respect to the associated undercoating.

In addition to light-absorbing ability, desirable characteristics for the panel and funnel undercoatings 18 and 28 are items (2), (3) and (4) above. In addition, the undercoatings should exhibit high optical contrast with respect to the associated overcoating.

Each of the undercoatings and overcoatings consists essentially of pigment particles and an alkali silicate binder. Some suitable light-colored, light-reflecting pigments for the overcoatings are titanium dioxide, barium sulfate, zirconium dioxide, and aluminum oxide. Some suitable dark-colored pigments for the undercoatings are graphite, black iron oxide, manganese dioxide, carbon black and refractory black pigments. The alkali silicate binders may be sodium silicate, potassium silicate, and/or lithium silicate. According to the invention, for each marking, the alkali silicate binder of at least one of the pigmented coatings, and preferably both the undercoating and the overcoatings, consists essentially of a three-component combination of sodium silicate, potassium silicate and lithium silicate. Sodium silicate and potassium silicate are applied from aqueous solutions thereof. Lithium silicate is produced from an aqueous suspension of a lithium-stabilized silica sol. Suitable lithium-stabilized silica sols are described in U.S. Pat. No. 2,668,149 to R. K. Iler, U.S. Pat. No. 3,459,500 to M. A. Segura et al. and U.S. Pat. No. 3,565,675 to R. H. Sams. The weight ratio of $SiO_2/Li_2O$ in the lithium-stabilized silica sol is in the range of about 4.0 to 20.0. The weight ratio of $SiO_2/K_2O$ and $SiO_2/Na_2O$ in each of the potassium silicate and sodium silicate solutions is in the range of 1.6 to 3.8. The silicate binders are in aqueous suspensions containing about 10 to 65 weight percent of silicate solids. The weight ratio on a dry basis of lithium-stabilized silica sol to potassium silicate and sodium silicate may be in the range of 1.2–2.1 to 2.5–3.5. Put another way, the dry silicate solids (100%) may be 25 to 45 weight percent lithium-stabilized silica solids, 55 to 75 weight percent potassium silicate solids and sodium silicate solids. The sodium silicate solids may be 32 to 43 percent and the potassium silicate solids may be 23 to 32 weight percent of the dry silicate solids. The preferred ranges are, on a dry basis, 26 to 30 weight percent lithium-stabilized silica solids, 29 to 32 weight percent potassium silicate solids and 38 to 42 weight percent sodium silicate solids.

Lower weight ratios of silica ($SiO_2$) to alkali ($Li_2O + Na_2O + K_2O$) in the suspensions generally yield coatings that are more adherent to glass but have a lower optical contrast in the marking. Higher weight ratios of lithium-stabilized silica sol with respect to the other silicates in the suspensions generally yield coatings that are physically harder and dry faster after application. Higher weight ratios of sodium silicate with respect to the other silicates improve the adhesion of the coating to the glass or undercoating. Higher weight rations of potassium silicate with respect to the other silicates produce harder coatings and generally reduced flaking. However, all three silicates are required, and the proper balance of proportions of the three silicates is necessary within the above-stated ranges. Optimum desired qualities are easily determined by relatively few laboratory trials.

A preferred formulation for producing a black undercoating in weight percent is as follows:

| | |
|---|---|
| Carbon black (Vulcan XC-72 marketed by Cabot Corp., Boston, Mass. | 3.89% |
| Manganese dioxide | 10.48% |
| Lithium-stabilized silica sol (Polysilicate 48, 22.1 solids, E. I. du Pont and Company, Wilmington, Del.) | 13.97% |
| Potassium silicate (Kasil 88, 28.95% solids, PQ Corp., Phila., PA) | 11.18% |
| Sodium silicate solution (C brand, 54% solids, PQ Corp., Phila., PA) | 8.38% |
| Deionized water | 48.21% |
| Dispersant (Marasperse CB and N22 mixed 1:3 by weight with water, American Can Co., Greenwich, CN) | 0.70% |
| Dispersant (Triton DF12, 2% solution in water, Rohm & Haas Co., Phila., PA) | 2.64% |
| Plasticizer (Neorez R-960, Polyvinyl Chemical Industries, Wilmington, Mass.) | 0.55% |

This undercoating formulation is milled in a ball mill for about 40 hours prior to spray coating.

A preferred formulation for producing a white overcoating in weight percent is as follows:

| | |
|---|---|
| Barium sulfate | 15.40% |
| Titanium dioxide | 15.40% |
| Lithium-stabilized silica sol (Polysilicate 48) | 12.00% |
| Potassium silicate solution (Kasil 88) | 9.61% |
| Sodium silicate solution (C brand) | 7.19% |
| Deionized water | 37.45% |
| Dispersant (Polywet ND-2, Uniroyal Corp., Naugatuck, Conn., 25% solids) | 2.46% |
| Plasticizer (Neorez R-960) | 0.49% |

This overcoating formulation was milled in a ball mill for about 24 hours prior to spray coating.

The constituents of each formulation are mixed together preferably with about 0.1 to 0.3 weight percent of dispersant. The constitutents of the coating formulations are mixed together and then ball milled for a period of time, for example, about 6 hours. The undercoating and the overcoating may be applied to the glass workpiece in any one of several ways depending on the nature of the coating. Spraying has been used successfully. Rolling may be used if the surface of the glass workpiece is not overly rough. The coatings may be applied in the form of a prescreened decal or other printing transfer. The application method chosen should produce a layer that is as uniform in thickness as possible, since the clarity of the readout from the marking usually is better when the various coatings have substantially constant thickness. The coatings, which are typically about 0.13 mm (0.5 mil) thick, should be thick enough to have the required optical characteristics and not so thick as to tend to crack or flake.

The undercoating is first applied to a selected area of the workpiece and then dried in less than 60 seconds, and usually less than 10 seconds, with some small amount of warming at temperatures below 100° C. to accelerate the drying. The overcoating is then applied to the undercoating and dried in less than 60 seconds, and usually less than 10 seconds, with some small amount of heating at temperatures below 100° C. to accelerate the drying. After applying the overcoating to the undercoating, the marks are recessed through the overcoating as by abrasion or ablation to expose the contrasting undercoating. Some suitable methods for recessing the marks into the overcoating are described in the above-cited patent to P. M. Heyman et al. and in U.S. Pat. No. 4,323,755 issued Apr. 6, 1982 to M. J. Nierenberg.

Then the coatings are heated or fired so as to fix the coating to the workpiece to make it integral with the main body of the workpiece and to increase its durability. Alternatively, the coatings may be heated or fired to make it integral with the main body of the workpiece, and then the marks of the marking are recessed therein. However, recessing marks into a fired overcoating is more difficult than recessing marks into the overcoating before firing. Heating or firing has the effect of integrating the coating into the main body. By this is meant that the coating and the body become essentially inseparable parts of a single article, and the coating cannot be removed from the body without destroying the overcoating. This is to be distinguished from a pigmented layer that is held to the body with an intermediate film of adhesive which can be softened and the layer released.

The combination of undercoating and overcoating as two integral layers produces a structure that has opposite optical characteristics (i.e., one is white and light-scattering or light-reflecting, and the other is black and light-absorbing). The parameters of the recessing system are adjusted so that the recessing is completely through the overcoating and just penetrates into the undercoating, which is closer to the glass body. If the layers are arranged so that the dark-colored light-absorbing layer is sandwiched between the light-colored light-reflecting layer and the glass, then the abraded marking has the preferred optical polarity. An advantage of this arrangement is that the dark-colored undercoating layer optically isolates the optical reader from any interfering reflections that may arise from behind the undercoating. However, the layers can be arranged so that the light-colored layer is sandwiched between the dark-colored layer and the glass.

The panel 11 (FIG. 1) and the funnel 21 (FIG. 3) are typical workpieces comprising integral undercoating and overcoating. Also, included within the invention are other workpieces or combinations of workpieces and/or other material or combinations of materials. Thus, any glass workpiece may be marked by the novel method. In the complete novel workpiece, the marking is recessed into the coatings which are integral with the glass workpiece. Thereby, the marking has substantially the same characteristics to the ambient as the workpiece itself. Being integral with the main body of the workpiece, there is no intermediate adhesive film present between the body and the coatings which limits the utility of the marking.

The markings may be read by detecting the differences in reflectivity between the marks of the marking and the surfaces therebetween in the specular angle. It is this difference which allows the marking to be read by a process including optically detecting the light reflection or the light scattering from the marked surfaces. Two devices which may be used to detect these markings are a laser scanner and a television camera. With a laser scanner, the light beam is scanned across the marked surface whereby the reflected light is modulated by the occurrence of recessed or nonrecessed areas. With a television camera, either ambient light or a fixed-light source provides the required illumination to activate the photosensitive surfaces in relation to the recessed or nonrecessed areas of the marking. The markings may be read with a commercially-available reader at intervals during and after the assembly of the workpiece into an assembled end product. A suitable reader is described in U.S. Pat. No. 3,801,182 to P. W. Jones in which a polarized light beam scans across the marking in a direction normal to the length of the bars of the marking. The reflected light is sensed and converted to a train of electrical signals representative of the marking. The signals are then decoded and used for some useful purpose, such as the control of a manufacturing process or for the compilation of historical data.

What is claimed is:

1. In a method for producing a machine-readable coded marking in a surface of a glass workpiece, said method including
   (a) applying to a selected surface area of said glass workpiece an undercoating comprising a first aqueous suspension consisting essentially of first pigment particles and a first alkali silicate binder,
   (b) drying said undercoating,
   (c) applying to said dry undercoating an overcoating comprising a second aqueous suspension of second pigment particles and a second alkali silicate binder,
   (d) drying said overcoating and
   (e) recessing a plurality of related marks through said overcoating,
   the improvement wherein at least one of said alkali silicate binders consists essentially of a mixture of dissolved sodium silicate, dissolved potassium silicate, and a lithium-stabilized silica sol.

2. The method defined in claim 1 wherein the weight percent of dry solids present in said mixture is:

| sodium silicate | 32 to 43% |
|---|---|
| potassium silicate | 23 to 32% |
| said silica sol | 25 to 45% |

3. The method defined in claim 1 wherein the weight percent of dry solids present in said mixture is

| | |
|---|---|
| sodium silicate | 38 to 42% |
| potassium silicate | 29 to 32% |
| said silica sol | 26 to 30% |

4. The method defined in claim 1 wherein each of said drying steps is conducted at temperatures below about 100° C.

5. The method defined in claim 4 wherein each of said undercoating and said overcoating is dried in less than about 60 seconds.

6. In a workpiece comprising a glass main body, a thin undercoating on a portion of said body and a thin overcoating on said undercoating, said overcoating having a plurality of related marks recessed therethrough, said undercoating consisting essentially of first pigment particles and a first alkali silicate binder and said overcoating consisting essentially of second pigment particles and a second alkali silicate binder, the improvement wherein at least one of said alkali silicate binders consists essentially of a mixture of sodium, potassium and lithium silicates.

7. The workpiece defined in claim 6 wherein said first pigment particles and said second pigment particles have contrasting optical properties with respect to one another.

8. The workpiece defined in claim 6 wherein each of said binders consists essentially of said mixture of silicates.

9. The workpiece defined in claim 6 wherein said mixture of silicates consists essentially of about:

| | |
|---|---|
| 32 to 43 weight % | sodium silicate |
| 23 to 32 weight % | potassium silicate |
| 25 to 45 weight % | lithium silicate |

10. The workpiece defined in claim 6 wherein said mixture of silicates consists essentially of about:

| | |
|---|---|
| 38 to 42 weight % | sodium silicate |
| 29 to 32 weight % | potassium silicate |
| 26 to 30 weight % | lithium silicate |

* * * * *